… … …
United States Patent [19]

Strasser et al.

[11] Patent Number: 5,107,976

[45] Date of Patent: Apr. 28, 1992

[54] TRANSPORT DEVICE

[75] Inventors: Karl-Heinz Strasser, Berg b. Ravensburg; Martin Röck, Tettnang, both of Fed. Rep. of Germany

[73] Assignee: Handtmann A-Punkt Automation GmbH, Baienfurt, Fed. Rep. of Germany

[21] Appl. No.: 667,049

[22] Filed: Mar. 8, 1991

[30] Foreign Application Priority Data

Mar. 12, 1990 [DE] Fed. Rep. of Germany ....... 4007800

[51] Int. Cl.⁵ ............................................. B65G 29/00
[52] U.S. Cl. ............................. 198/345.3; 198/465.2; 198/687.1
[58] Field of Search ............... 198/345.3, 465.1, 465.2, 198/465.4, 680, 687.1, 803.01

[56] References Cited

U.S. PATENT DOCUMENTS

| | | | |
|---|---|---|---|
| 3,252,581 | 5/1966 | Jenkins et al. | 198/680 X |
| 3,595,368 | 7/1971 | Mantovani | 198/465.2 |
| 3,666,076 | 5/1972 | Miller et al. | 198/345.3 |
| 4,209,088 | 6/1980 | Siarto | 198/345.3 |
| 4,257,513 | 3/1981 | Siarto | 198/345.3 |
| 4,356,904 | 11/1982 | Sairto | 198/345.3 |
| 4,570,782 | 2/1986 | Cargill et al. | 198/345.3 |

FOREIGN PATENT DOCUMENTS

| | | | |
|---|---|---|---|
| 0046676 | 12/1932 | Denmark | 198/465.2 |
| 0895181 | 5/1962 | United Kingdom | 198/465.2 |

Primary Examiner—Robert P. Olszewski
Assistant Examiner—James R. Bidwell
Attorney, Agent, or Firm—Robert W. Becker & Associates

[57] ABSTRACT

A transport device for the controllable conveying of transport containers from a loading station to an unloading station with a preferably horizontally oriented, continuously rotating transport device in the form of a transport wheel is provided. The transport containers are suspended at a carrier that engages and disengages the transport wheel. With the transport wheel it is possible to compensate for different operating speeds of the machines that are interconnected by the transport wheel, so that an automated and continuous operating mode with little operating expenditure is provided. The transport wheel serves also as a storage unit for a packing unit arranged at the unloading station which may be operated continuously during shut-down periods of the preceding machine.

24 Claims, 4 Drawing Sheets

TRANSPORT DEVICE

BACKGROUND OF THE INVENTION

The present invention relates to a device for conveying in a controllable manner a transport container from a loading station to an unloading station, especially for the packing-ready conveying of sausages to a packing machine or packing unit.

Currently, sausages that have been portioned and twisted off in a sausage stuffing machine are removed from that machine manually and are then placed in packing containers of a subsequent packing unit. This method is not only laborious and expensive since up to five people are needed in order to convey the sausages coming from the sausage stuffing machine to the packing unit, but is also unhygienic. Each individual sausage must be picked up by hand, and at times, must be held for an extended period of time so that, during the time needed for a casing exchange in the sausage stuffing machine which is working at a high portioning speed, the packing unit which is working in cycles may be loaded. Manually conveying sausages from the sausage stuffing machine to the packing unit is therefore not economical and outdated.

It is therefore an object of the present invention to provide a transport device with which it is possible to introduce in an automated process the sausages that have been portioned and twisted off by a sausage stuffing machine into packing containers of a packing unit, without the sausages having been touched by personnel. The construction of such an apparatus should be kept simple and, at the same time, the operating costs should be reduced to a great extent by reducing the necessary personnel compared to the required personnel for prior art methods. It is also an object of the present invention to overcome the different operating speeds of the interconnected machines, so that the shut down periods required for a casing exchange in the sausage stuffing machine will not adversely affect the continuously working packing unit.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
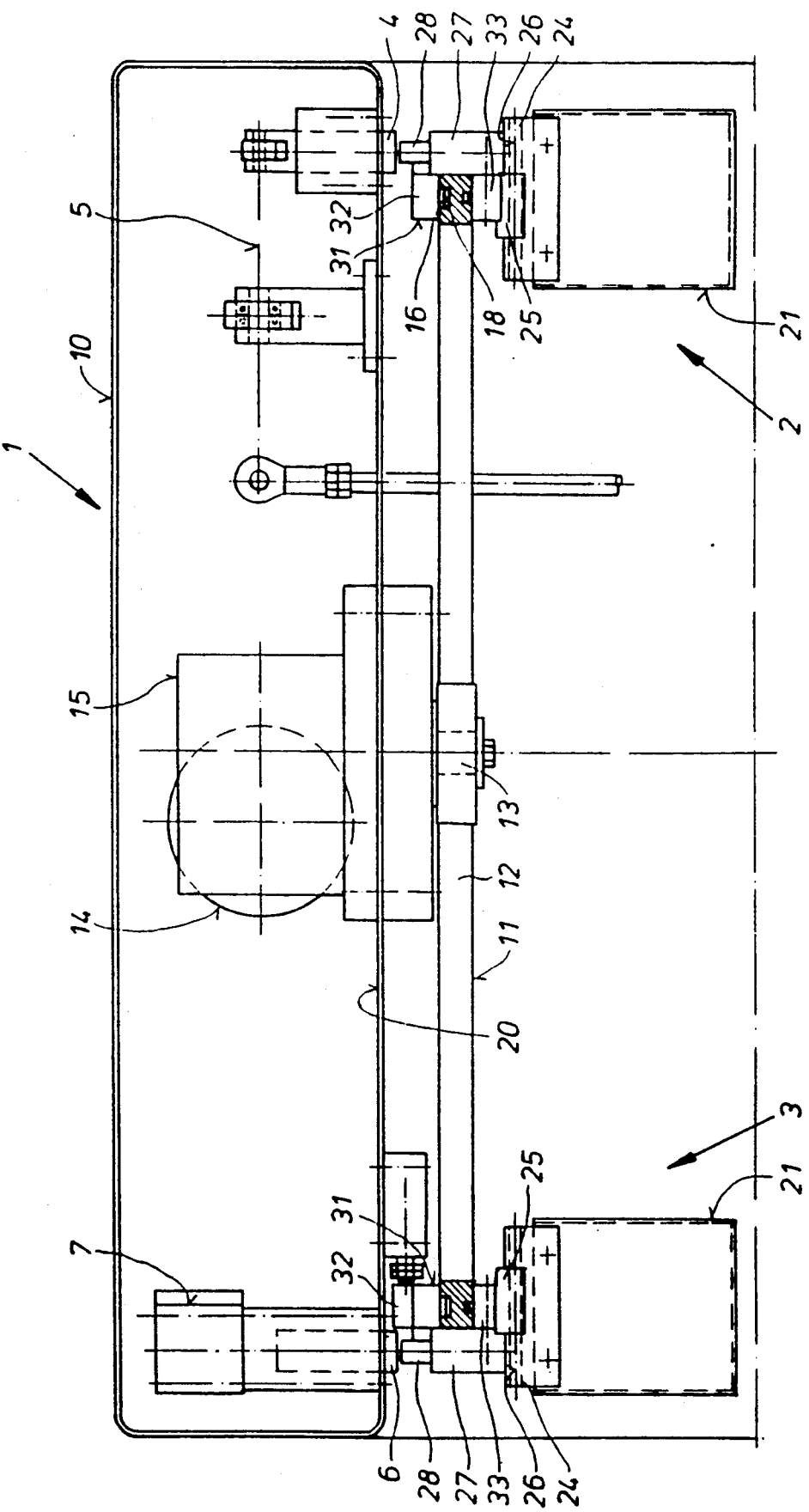
FIG. 1 is a side view of the transport device.

The transport device of the present invention is primarily characterized by a preferably horizontally arranged, continuously rotating transport means in the form of a transport wheel, a transport belt etc., from which the transport containers with the aid of respective carriers are suspended, whereby the carriers are optionally engaging and disengaging the transport means.

The carrier of the transport container is preferably embodied in the form of two rails that are arranged, spaced at a distance from one another, vertically above one another. The transport means interlocks between the two rails. At the front end of the upper rail of the carrier, viewed in the transport direction of the transport means, a clamping part is pivotably supported, whereby the carrier achieves a frictional connection with the transport means via the clamping part.

The clamping part in a simple embodiment is provided in the form of an angular lever, pivotably supported via a bolt at a recess of the upper rail. The angular lever at a leg facing the transport means, is preferably provided with a spherically shaped clamping surface which is recessed with respect to the pivoting axis represented by the bolt. Also, the clamping part is provided with a pressure spring which acts in the transport direction of the transport means.

It is advantageous, that the upper rail of the carrier, at the rear end thereof opposite the clamping part, is provided with a projection, preferably in the form of a pin, arranged advantageously parallel to the longitudinal direction of the pressure spring that is acting onto the clamping part. When two transport containers pile up next to each other, the pin of a first one of the piled-up transport containers releases the clamping part of a second adjacent transport container from the frictional connection with the transport means by pivoting the clamping part of the second adjacent transport container away from the transport means.

The clamping part, in the area of the clamping surface, is laterally guided in a groove that is provided at the transport means. The contact surface of the transport means that engages the clamping surface of the clamping part is provided with a coating of a high friction coefficient.

The transport device, respectively the loading and/or unloading station, is provided with a moveable abutment, for example, in the form of a preferably vertically slidable bolt having a vertically extending abutment surface. The abutment releases the clamping part of the carrier from the transport means. The abutment is provided with a slanted portion that cooperates with the free leg of the clamping part, while the upper rail of the carrier is provided with a projection that cooperates with the abutment surface of the abutment.

It is also advantageous to control the opening and closing movements of the transport container, which is preferably provided in the form of two halves that are pivotable toward one another at the loading station with respect to a feed rate of the respective piece goods to be loaded, for example, via a linkage or a controllable servo device, while at the unloading station the opening and closing movements are controlled with respect to the working cycles of the packing unit, for example, via a servo device. The loading and/or unloading station of the transport device is provided with control elements connected to a control device. The control elements may be arranged before and/or after the loading respectively unloading station.

With the inventive transport device wherein the transport containers engage a continuously rotating transport means, an automated and continuous process with little operating expenditure is provided. The different operating speeds of the interconnected machines are compensated, and the sausages that are transported are treated gently so that the amount of low quality products is reduced. With the inventive transport device transport containers may be stored in front of the unloading station, so that the transport device actually serves as a storage means for the packing unit. Thus, the packing unit may be operated continuously even during shut-down periods of the sausage stuffing machine due to casing exchanges.

It is also advantageous, that the transport device provides a high productivity and is also adjustable to different products so that a high flexibility and a programable capacity are achieved. Since the sausages during the conveying process are not touched by personnel and no manual labor is required, a hygienic handling is ensured. The inventive transport device therefore allows for the complete automization of the process, from the sausage production in the sausage stuffing machine to the packing in the packing unit, with a minimum constructive expenditure.

DESCRIPTION OF PREFERRED EMBODIMENTS

Figure 2:
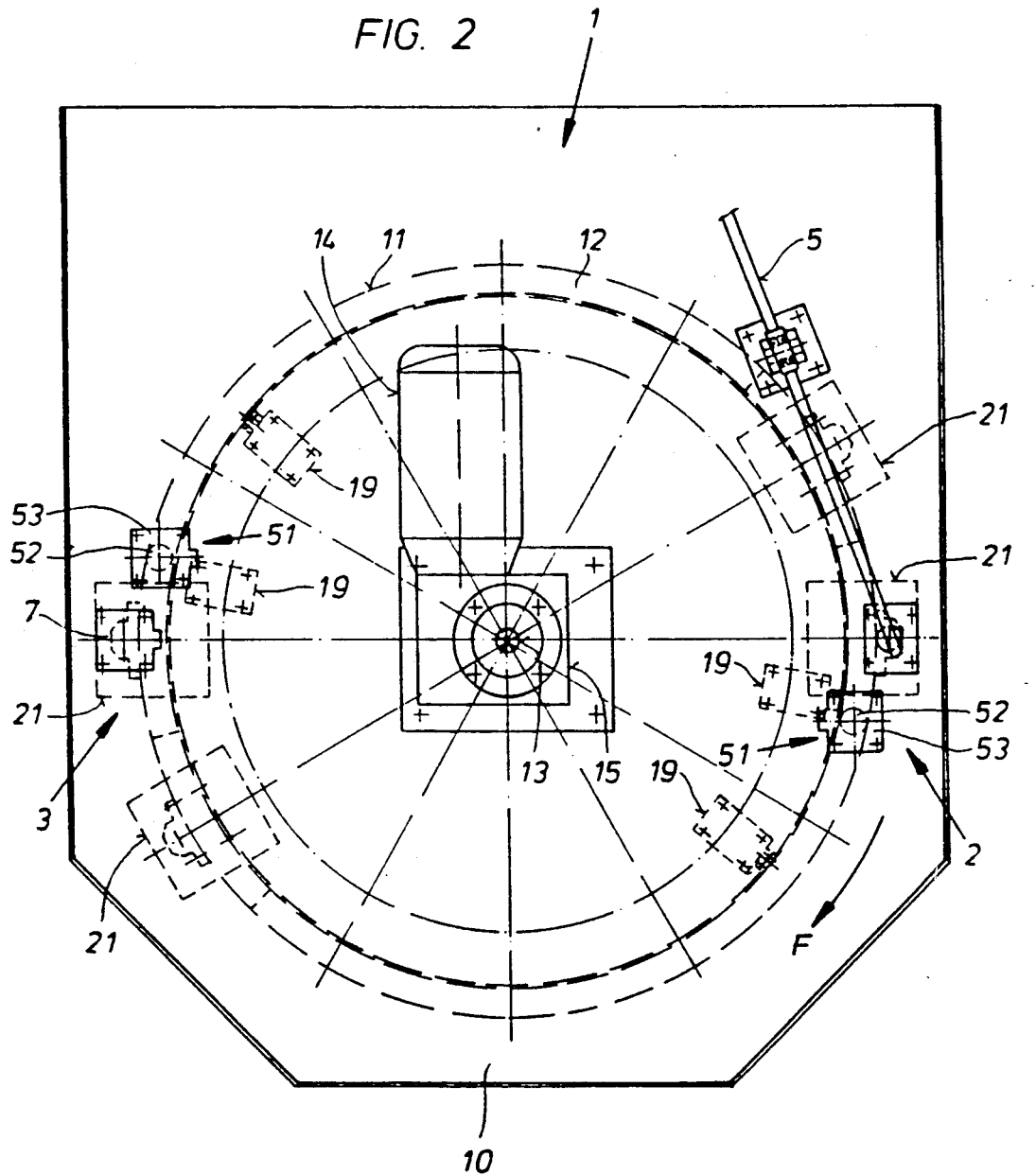
FIG. 2 is a plan view of the transport device according to FIG. 1.

The present invention will now be described in detail with the aid of several specific embodiments utilizing the drawings. The transport device 1 represented in FIGS. 1 and 2 serves to convey in a controllable manner transport containers 21 of a loading station 2 to an unloading station 3, for example, in order to convey fresh, non-smoked sausages, that have been portioned and twisted off automatically by a sausage stuffing machine, to a packing unit. The transport containers 21 are loaded in the loading station 2 in correspondence to the production rate of the sausage stuffing machine and are unloaded at the unloading station S with respect to the working cycle of the packing unit. Thus, the transport device 1 compensates for different operating speeds of the interconnected machines. Conveying of the transport containers 21 is achieved via a transport means 11 in the form of a transport wheel 12. The shaft 13 of the transport wheel 12 is pivotably supported at a partition 20 of a support frame 10. The transport wheel 12 is drivably connected via a gear unit 15 to a drive motor 14 and is continuously driven.

The transport container 21 comprises two pivotable halves 22 and 23 that engage and disengage the transport wheel 12 in the loading station 2, in the unloading station 3 as well as during pile-up, for example, at the transport wheel 12 in front of the unloading station 3. This is achieved via adjustable abutments 51 and a clamping part 35, that is disposed at a carrier 31 at which the halves 22 and 23 of the transport container 21 are suspended.

Figure 3:
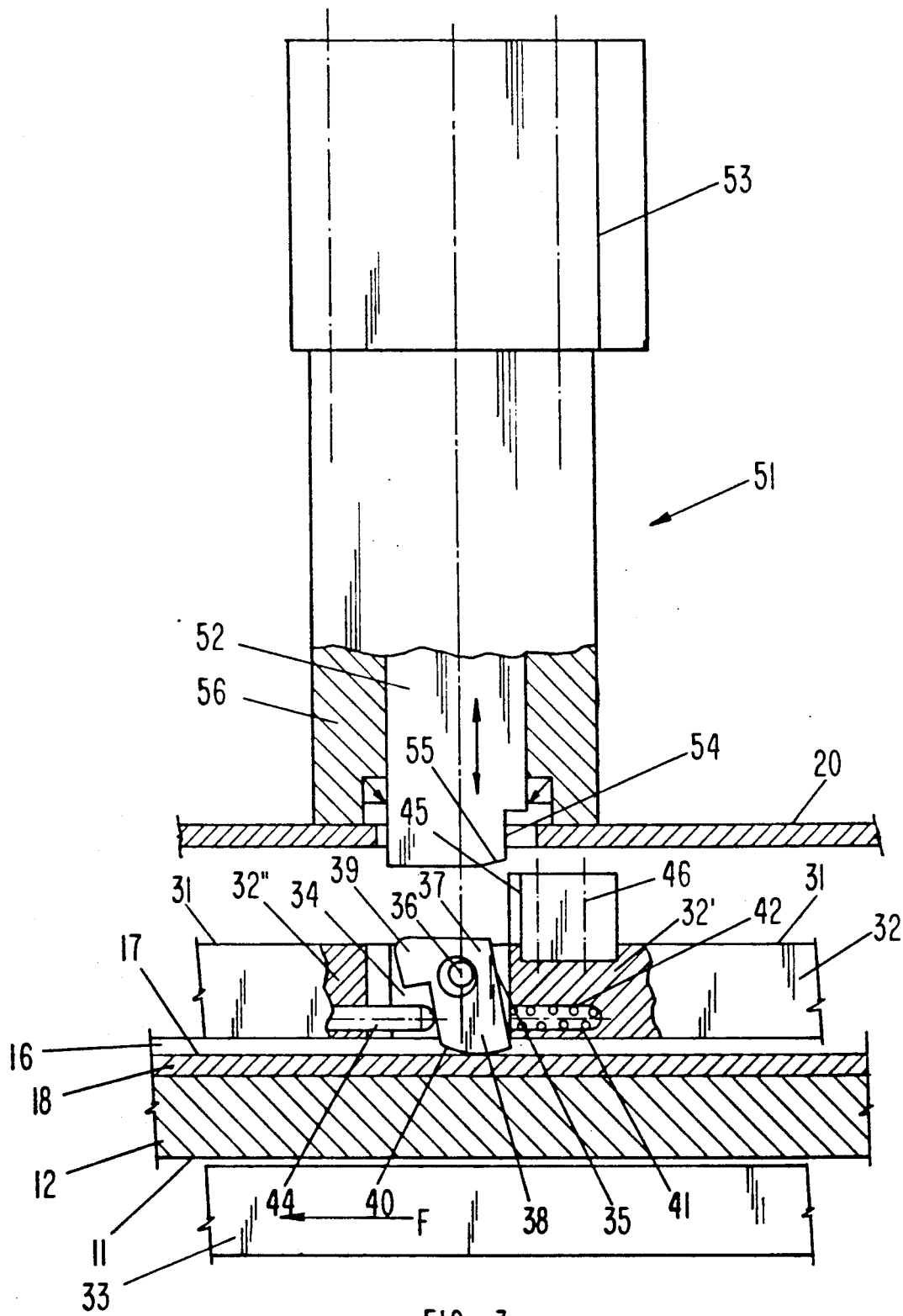
FIG. 3 shows an adjustable abutment of the loading and unloading station of the transport device according to FIGS. 1 and 2.
Figure 4:
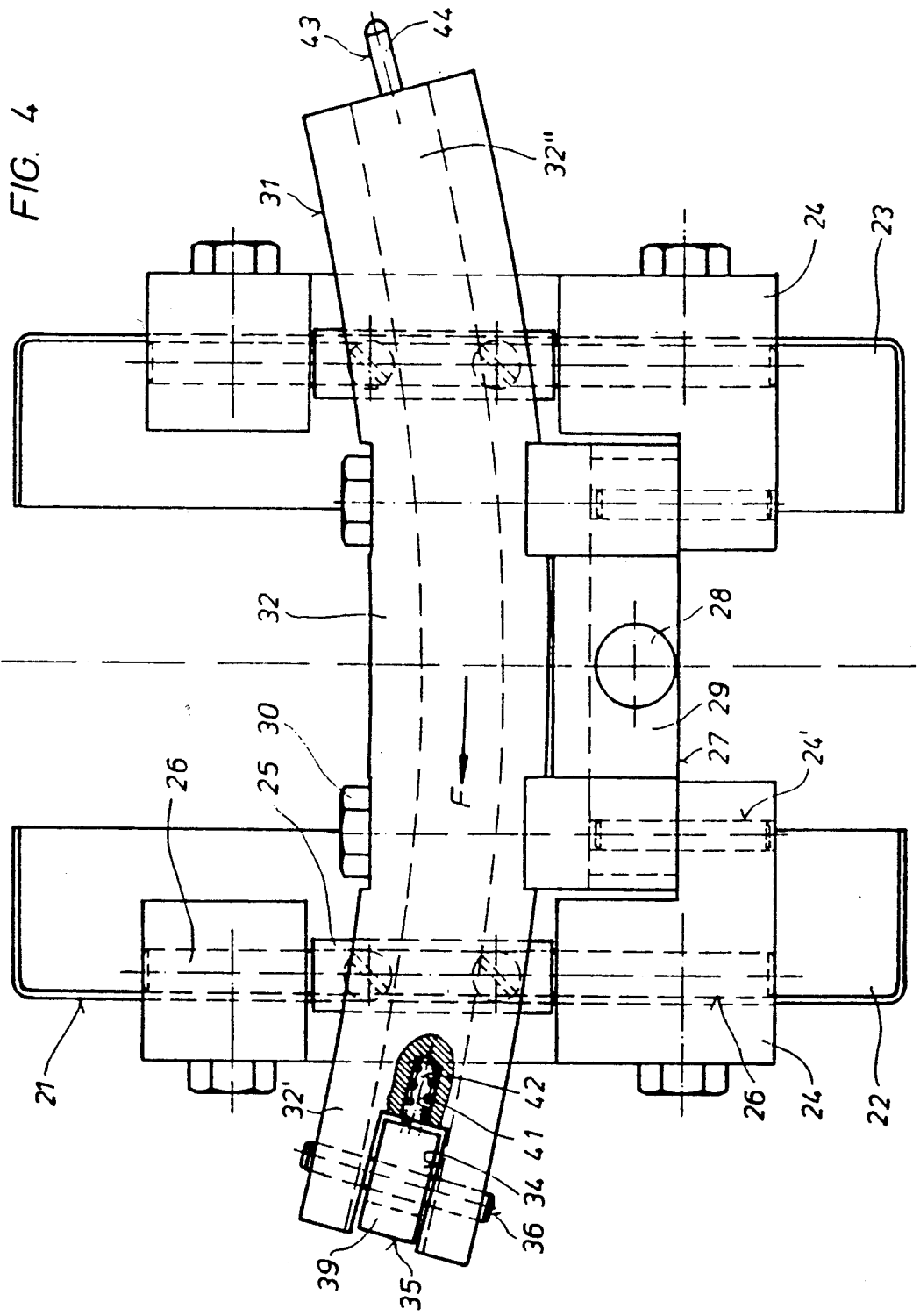
FIG. 4 shows a plan view of the transport container employed in the transport device according to FIGS. 1 and 2.

The carrier 31 comprises, as is shown in particular in FIGS. 3 and 4, two rails 32 and 33 that are curved corresponding to the curvature of the transport wheel 12 and are arranged vertically above one another and are spaced at a distance from one another. The transport wheel 12 interlocks between the two rails 32, 33. At the front end 32', viewed in the transport direction F, of the upper rail 32 the clamping part 35 is inserted into a recess 34 and secured by a bolt 36. The clamping part S5 is embodied as an angular lever 37 which is pivotable about the bolt 36. The leg 38 of the angular lever 37 that is facing downward is provided with a spherically shaped clamping surface 40 that is recessed with respect to the bolt 36. The clamping surface 40 cooperates with a contact surface 17 of the transport wheel 12. For this purpose a continuous groove 16 is provided at the transport wheel 12 and the contact surface 17 is provided with a coating 18 having a high friction coefficient. The leg 38 of the angular lever 37 is thus laterally guided at the groove 16. A pressure spring 42 which is disposed in a bore 41 of the rail 32 acts on the clamping part 35 so that the leg 38 of the angular lever 37 is pressed against the contact surface 17 of the transport wheel 12.

At the rear end 32" of the rail 32 a protruding projection 43, preferably in the form of a pin 44, is provided. The pin 44 is arranged parallel to the longitudinal direction of the spring 42 and acts on the clamping part 35 when two transport containers 21 pile up, as shown in FIG. 3. With the aid of the pin 44 the clamping part 35 is pushed against the force of the spring 42 and pivoted away from the contact surface 17 of the transport wheel 12, thus the frictional connection between the clamping part 35 and the transport wheel 12 is disengaged.

The adjustable abutment 51 which is coordinated to the loading station and the unloading station 3, as can be seen in FIG. 3, comprises a bolt 52 that is slidably supported at a housing 56. A servo device 53 serves to adjust the bolt 52. The bolt 52 is provided with a vertically oriented abutment surface 54. A projection 45 is fastened to the rail 32 via screws 46. The projection 45 cooperates with the abutment surface 54 of the bolt 52. The face of the bolt 52 is provided with a slanted portion 55 that interacts with the free leg 39 of the angular lever 37 such that the drive connection achieved in a frictional manner between the clamping part 35 and the transport wheel 12 is suspended by pivoting the clamping part 35 away from the contact surface 17 of the transport wheel 12 when a shut down of the loading station 2 or the unloading station 3 is desired.

The two halves 22 and 23 of the transport container 21 are disposed at levers 24 that are pivotably supported at a holding rail 25 that is fastened to the lower rail 33 of the carrier 31 via joint bolts 26. Furthermore, the levers 24 are jointedly connected via bolts 24' to a control member 27 that is provided in the form of a transverse stay. The transverse stay is provided with a bolt 28 extending in an upward direction. The bolt 28 is supported at a bearing 29 which is fastened by screws 30 to the rails 32 and 33 of the carrier 31. By adjusting the bolt 28 and thus the control member 27, the halves 22 and 23 may be pivoted sideways thereby opening and closing the transport container 21.

For the actuation of the bolt 28 a thrust bolt 4 is provided at the loading station 2 which is controlled via a linkage 5 with respect to the amount of piece goods that is conveyed towards the transport containers. A thrust bolt 6 provided for the same purpose at the unloading station 3 is actuated by a servo device 7 which is controllable with respect to the working cycle of the packing unit that is interconnected with this transport device 1.

The transport containers 21 that have been loaded at the loading station 2 engage the transport wheel 12 as soon as the respective adjustable abutment 51 is released. The transport containers 21 are then conveyed to the unloading station 3. The engagement is achieved such that, due the force of the spring 42, the clamping part 35 is forced against the contact surface 17 of the transport wheel 12 so that a frictional connection is achieved. In the case that a transport container 21 is already present at the unloading station 3, the drive connection is suspended and the transport container 21 is not conveyed any further since the protruding projection 41 presses against the leg 38 of the angular lever 39 thereby disengaging the frictional drive connection between the contact surface 17 and the leg 38. In this manner transport containers 21 may be piled up so that a storage means between the two machines interconnected by the transport device 1 is realized. As soon as the transport container 21 that is first in line at the unloading station 3 is unloaded and, after the respective abutment 51 has been released, conveyed to the loading station 2, the transport containers 21 that are on standby at the unloading station 3 are transported further. Since the transport device 1, at the loading station 2 and/or the unloading station 3, is also equipped with respective control elements 19 that are connected to a control unit, a respective monitoring of the conveying process is easily achieved.

The present invention is, of course, in no way restricted to the specific disclosure of the specification and drawings, but also encompasses any modifications within the scope of the appended claims.

What we claim is:

1. A transport device for controllably conveying transport containers from a loading station to an unloading station, comprising:
   a horizontally arranged, continuously rotating transport means, with said transport containers being suspended via respective carriers at said transport means, and with said carriers optionally engaging and disengaging said transport means; and
   each one of said carriers of said transport containers being comprised of two rails that are arranged vertically above one another and are spaced at a distance from one another, with said transport means being optionally engaged and disengaged between said two rails.

2. A transport device according to claim 1, wherein said transport means is a transport wheel.

3. A transport device according to claim 1, wherein said transport means is a transport belt.

4. A transport device according to claim 1, wherein a clamping part is pivotably supported at a front end of an upper one of said rails, when viewed in a transport direction of said transport means, with said carrier achieving a frictional connection with said transport means via said clamping part.

5. A transport device according to claim 4, wherein said clamping part is an angular lever that is pivotably supported via a bolt at a recess of said upper rail, with said angular lever, at a leg thereof that is facing said transport means, being provided with a spherically shaped clamping surface.

6. A transport device according to claim 4, wherein a pressure spring acting in said transport direction is coordinated with said clamping part.

7. A transport device according to claim 6, wherein a rear end of said upper rail that is facing away from said clamping part is provided with a projection that is aligned parallel to a longitudinal direction of said spring, whereby, during pile-up of two of said carriers on said transport means, said projection of a first one of said piled-up carriers releases said clamping part of a second adjacent carriers from said frictional connection with said transport means by pivoting said clamping part of said second adjacent carrier away from said transport means.

8. A transport device according to claim 7, wherein said projection is a pin.

9. A transport device according to claim 5, wherein said clamping part, in an area of said clamping surface, is laterally guided by a groove provided at said transport means.

10. A transport device according to claim 5, wherein a contact surface of said transport means that engages said clamping surface of said clamping part is equipped with a coating having a high friction coefficient.

11. A transport device according to claim 4, wherein a movable abutment is provided that releases said clamping part from said transport means.

12. A transport device according to claim 11, wherein said abutment is a vertically slidable bolt having a vertically extending abutment surface.

13. A transport device according to claim 11, wherein said abutment is provided at said loading station.

14. A transport device according to claim 11, wherein said abutment is provided at said unloading station.

15. A transport device according to claim 11, wherein said abutment is disposed at said loading station and said unloading station.

16. A transport device according to claim 11, wherein said abutment is provided with a slanted portion that is cooperating with a free leg of said clamping part.

17. A transport device according to claim 12, wherein said upper rail is provided with a projection that is cooperating with said abutment surface.

18. A transport device according to claim 1, wherein opening and closing movements of said transport containers, that are comprised of two halves that are pivotable toward and away from one another, at said loading station are controllable with respect to a feed rate of piece goods to be loaded, and at said unloading station are controllable with respect to a working cycle of a packing unit.

19. A transport device according to claim 18, wherein said opening and closing movements at said loading station are controllable via a linkage.

20. A transport device according to claim 18, wherein said opening and closing movements at said loading station are controllable via a controllable servo device.

21. A transport device according to claim 18, wherein said opening and closing movements at said unloading station are controllable via a controllable servo device.

22. A transport device according to claim 11, wherein control elements that are connected to a control device are provided at at least one of said loading station and said unloading station.

23. A transport device according to claim 22, wherein said control elements are arranged before said at least one of said loading station and unloading station.

24. A transport device according to claim 22, wherein said control elements are arranged after said at least one of said loading station and unloading station.

* * * * *